United States Patent [19]

Dittman

[11] Patent Number: 5,714,821
[45] Date of Patent: Feb. 3, 1998

[54] ALTERNATING CURRENT GENERATOR WITH DIRECT CONNECTED EXCITER WINDING

[75] Inventor: William B. Dittman, Mosinee, Wis.

[73] Assignee: Marathon Electric Mfg. Corp., Wausau, Wis.

[21] Appl. No.: 197,072

[22] Filed: Feb. 16, 1994

[51] Int. Cl.[6] .................... H02H 7/06; H02P 9/10; H02N 1/00; H02N 3/00
[52] U.S. Cl. .................... 310/179; 36/180; 322/25; 322/59; 322/63
[58] Field of Search .................... 318/139, 148, 318/151, 158, 769, 771; 322/59, 63, 65, 66, 25, 22, 24; 310/179, 180, 184

[56] References Cited

U.S. PATENT DOCUMENTS

| | | | |
|---|---|---|---|
| 2,377,930 | 6/1945 | Fuller | 171/123 |
| 2,414,287 | 1/1947 | Crever | 171/119 |
| 2,497,141 | 2/1950 | Schultz | 172/120 |
| 2,722,652 | 11/1955 | Brainard | 322/25 |
| 2,992,380 | 7/1961 | Potter | 322/25 |
| 3,035,222 | 5/1962 | Stone | 322/93 |
| 3,130,360 | 4/1964 | Churilow | 322/25 |
| 3,210,644 | 10/1965 | Sparrow | 322/25 |
| 3,768,002 | 10/1973 | Drexler et al. | 322/25 |
| 4,117,388 | 9/1978 | Roche | 322/25 |
| 4,233,555 | 11/1980 | Roche | 322/25 |
| 4,262,242 | 4/1981 | Glennon | 322/28 |
| 4,268,788 | 5/1981 | Takeda et al. | 322/59 |
| 4,314,194 | 2/1982 | Severing | 322/89 |
| 4,408,152 | 10/1983 | Szippl et al. | 322/29 |
| 4,442,396 | 4/1984 | Hucker | 322/21 |
| 4,496,897 | 1/1985 | Unneweher et al. | 322/25 |
| 4,700,959 | 10/1987 | Lars | 280/791 |
| 4,951,992 | 8/1990 | Hockney | 296/204 |
| 4,991,897 | 2/1991 | Karapetian | 296/29 |
| 5,094,504 | 3/1992 | Wurl | 296/185 |
| 5,143,416 | 9/1992 | Karapetian | 296/29 |
| 5,205,587 | 4/1993 | Orr | 280/785 |

*Primary Examiner*—Thomas M. Dougherty
*Assistant Examiner*—Michael Wallace, Jr.
*Attorney, Agent, or Firm*—Andrus, Sceales, Starke & Sawall

[57] ABSTRACT

A three phase four pole alternating current generator includes an AC exciter including a series winding for each phase of the main generator windings and a shunt winding for each of the main phase windings. The series exciter windings includes two coils. In a high Y connection of the winding, the two coils are connected in series with each other and with the main phase winding. In the low voltage Y connection, series coils are separated and each is located in a paralleled leg of the same main phase winding. The shunt winding is connected directly across a corresponding main phase winding. An electronic voltage regulator includes phase voltage sensing which is coupled to a reference control circuit to produce a control signal if the voltage varies from a reference voltage. The current to the shunt winding of the exciter is controlled to maintain the desired output voltage. The system establishes and maintains a selected voltage in a balance condition with minimum circuit connection and improved overall performance and is applicable for all sizes of generators of a particular design.

16 Claims, 4 Drawing Sheets

5,714,821

1

ALTERNATING CURRENT GENERATOR WITH DIRECT CONNECTED EXCITER WINDING

BACKGROUND OF THE INVENTION

This invention relates to an alternating current generator including an interconnected rotating transformer exciter having a direct connected primary winding.

Alternating current generators require supply of excitation current. U.S. Pat. No. 3,210,644, which issued Oct. 5, 1965, and is assigned to the same assignee of the present application, discloses a tapped winding for interconnecting of the primary winding of a rotating exciter to the generator winding. The exciter includes a compound primary winding, a portion of which is connected in shunt to a corresponding phase winding of the generator and a series winding which carries current proportional or equal to the generator load current. Generally, the generator includes a "frequency converter excitation system" including a stator having a shunt winding and a series winding in each phase. The series winding is connected directly in series with the main stator winding to the output. The shunt winding is powered with only a small fraction of the main stator voltage as a result of a tapped interconnection, as shown in the above patent. The same voltage condition can be provided by an external transformer or a combination of a tapped and external transformer. The secondary of the exciter winding is coupled through a rectifier to the generator field winding. The tapped version of the exciter is shown therein and provides a highly effective and reliable excitation system. Notwithstanding the many advantages thereof, the tapped coils and the many required interconnections introduce some complexity from the standpoint of generator fabrication.

The assignee devised and sold a no-tap design in which the exciter primary winding included connection of the series winding of the exciter connected directly in series with one of the main winding of the generator output winding. While the shunt winding of the exciter was connected directly across such main winding. In the no-tap design of the prior art, the shunt winding is powered by the full voltage of the main stator winding. The excitation current corresponds to the current through only one main winding and thus provides a minimum current flow through the exciter winding. Further, such a circuit connection reduced the total interconnections required with respect to a tapped winding. Thus, each connection between the main and the exciter winding requires a separate connection. In the original tapped design for a three phase generator, twelve separate connections were required for interconnecting of the coils in circuit with the main windings. With the prior no-tap design, the interconnections were reduced by six, with a minimum level of the series current. However, the no-tap design was primarily effective with a single voltage alternating current generator. Alternating current generators are preferably designed for two alternate voltages, such as 240 volts or 480 volts. The different voltages are provided by dividing the generator output winding into first and second main windings for each phase. Series connection of the two main windings produces the high voltage connection, and a parallel connection of the two main windings produces the low voltage connection. However, with the parallel connection in the no-tap design, a voltage unbalance is created, with a circulating current. The output voltage does not therefore change directly as required when the connection between a high voltage wye connection and a low voltage wye connection is made. Although, the difference is quite small in relatively large kilowatt units, such as a 300 KW generator, on lower kilowatt units such as a 15 Kilowatt unit, a significant voltage difference arises. Thus, the no-tap design has not been considered satisfactory for a universal application.

The prior no-tap design as disclosed also permitting for the direct preset regulation using an impedance control device in series with the shunt winding and/or in parallel with the shunt and series windings of the exciter. Although providing an improved regulation system, care must be taken in use of the generator as each section is particularly operative for a given operating point and the voltage may vary due to load, time or temperature conditions.

Thus, although the tapped design and prior no-tap design of the exciter connection to the main windings of the generator have both provided satisfactory performance of the generator, there is a need for a more simplified circuit connection design and particularly a no-tap design which can provide essentially a balanced condition for all sizes of generators equivalent to that provided by the prior tapped design.

SUMMARY OF THE PRESENT INVENTION

The present invention is particularly directed to a no-tap exciter circuit connection for an alternating current generator having an integrated transformer exciter unit.

In a dual voltage four pole generator, each phase winding of the generator includes a first and a second main winding which can be connected in series for a high voltage connection and in a parallel low voltage connection. Generally, each first and second main winding is formed as a pair of parallel coils or a pair of series coils to provide the desired voltage output. The prior art design is well known and no further description is given other than as necessary in the subsequent discussion of the embodiments of the present invention. Generally in accordance with the teaching of the present invention, the series windings of the exciter is formed with two coils which are interconnected to the corresponding main phase winding, with each one of the two coils separately connected in series with one of the parallel main windings. The shunt winding is connected directly across a main phase winding as heretofore connected. With the main windings connected in a high wye connection, the two coils are connected in series with each other and with the main windings. When connected in the low voltage wye connection, the series coils are separated and each is located in a paralleled leg of the same main winding. Applicant has found that this circuit connection of the exciter coils establishes and maintains the voltage in a balanced condition, and requires minimum circuit connections while improving the overall performance of the generator by establishing and maintaining a balanced state in the low wye condition as well as the high wye condition. Further, the system establishes and maintains such a balanced state for all sizes of the generators and thus is generally universally applicable to a line of generators.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DESCRIPTION OF THE ILLUSTRATED EMBODIMENT

The present invention is directed to the exciter circuit and its interconnection to the main generator circuit. The physical construction of the alternator may be in accordance with any well known system such as that shown in U.S. Pat. No. 3,210,644 wherein the main generator and the exciter are mounted on a single common shaft driven from a prime mover or mounted separately and driven by separate prime movers with an electrical circuit interconnections as shown in the above patent.

Figure 1:
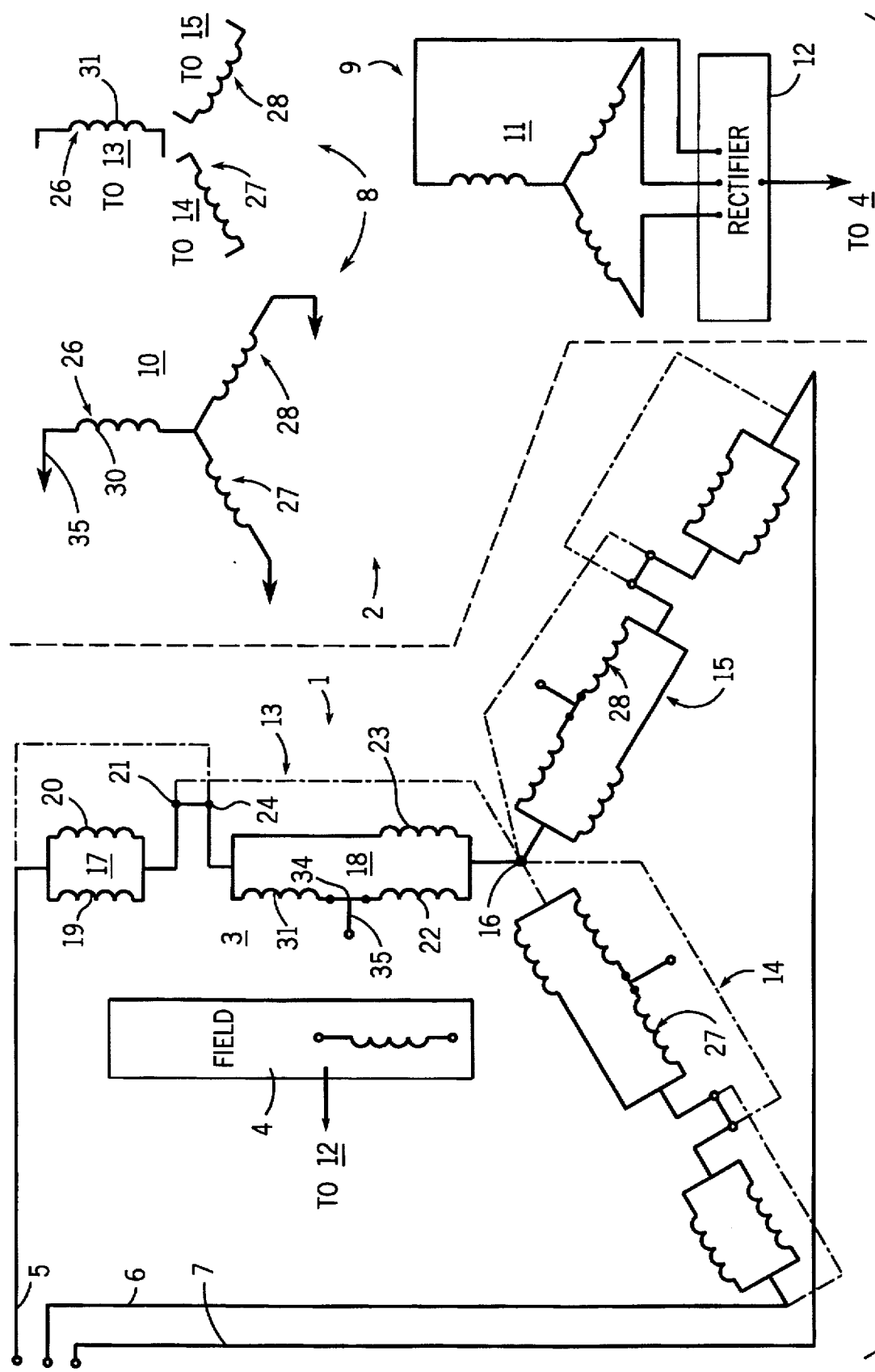
FIG. 1 is a schematic illustration of an alternator illustrating a no-tap design as heretofore manufactured and sold by the assignee of this application.

Referring particularly to FIG. 1, a no-tap dual voltage generator as heretofore manufactured and sold by the assignee of this application is illustrated including a three phase alternating current generator 1 and a direct connected three-phase exciter 2.

The alternating current generator 1 includes a stationary three-phase output winding 3 and a rotating field winding 4. The output winding 3 provides a three-phase output appearing at the output terminals 5, 6 and 7. The rotating field winding 4 is driven by an appropriate prime mover, not shown. The field winding structure may be of any suitable construction, such as shown in U.S. Pat. No. 3,210,644 or such as that heretofore used in connection with alternating current generators or any variation, operating on the well known interrelationship between a rotating field winding 4 and the output winding 3. The circuit of FIG. 1 illustrates an exciter 2 constructed as a rotating transformer as also disclosed in U.S. Pat. No. 3,210,644. Thus, the exciter 2 includes a stator 8 and a rotor 9.

The exciter can be constructed in accordance with the prior art teaching as either a single phase or multiple phase unit and is shown as a three phase unit. The stator 8 has a three phase winding 10, which is specially constructed and connected in circuit as more fully developed hereinafter. The rotor has a three-phase winding 11 equal to that of the stator windings and each has the same number of poles as on the stator 8. The exciter 2 thus functions essentially as a transformer or induction frequency converter with the stator winding 10 serving as a primary winding and the rotor winding 11 as the secondary winding. The output of the exciter secondary winding 11 is coupled through a rectifier unit 12 to energize the rotating field winding 4 of the generator 1 with an appropriate D.C. current. With the generator rotor 4 and the exciter rotor 9 mounted on a common shaft, not shown, a brushless generator unit is provided. If the rotors 4 and 9 are driven by separate drive units, a brush connection can of course be provided.

As also known, permanent magnets, not shown, are coupled to the generator magnetic system to initiate some current which flows from the generator output windings 3 to the exciter winding 10 which in turn energizes the field winding 4 to increase the output in a continuous manner.

Referring particularly to FIG. 1, the main generator is shown including three identical phase windings 13, 14 and 15 interconnected in a wye connection. Each phase winding has a main output terminal or line 5, 6 and 7 and in the illustrated wye connection to a central common terminal 16, which is generally connected as a common ground. Alternately, the connection or terminal 16 may provide a floating non-grounded output.

Referring to the first phase winding 13 for purposes of description, the winding 13 consists of a first main winding 17 and a second main winding 18 essentially identical to the first. The first main winding 17 consists of first and second coils 19 and 20 of an identical construction and connected in parallel with each other, with one common connection connected to the output terminal 5. The opposite side or connection of the parallel coils 19 and 20 is connected to an internal connection terminal 21. The second main winding 18 includes a similar identical pair of coils 22 and 23 again interconnected in parallel with each other, with one side connected to the common terminal 16 and the opposite or high voltage side connected to an interconnecting terminal 24.

In addition, in the illustrated embodiment of the invention, one coil 22 of the second main winding 18 is connected to the stator winding 8 of the exciter, as more fully developed hereinafter. Thus, the three phase generator windings connected as illustrated provides a three phase voltage and current at the three output terminals 5, 6 and 7 with respect to the common terminal 16, constituting a ground or neutral connection.

With the terminals 21 and 24 connected, as shown in FIG. 1, the main windings 17 and 18 are connected in series and provide a high voltage output.

By reconnecting of the terminals as shown in phantom is FIG. 1, with terminal 21 connected to the common neutral terminal 16 and the terminal 24 connected to the output terminal 5. The main windings 17 and 18 are connected in parallel. A low voltage output is produced at terminals 5, 6 and 7.

Each phase winding of the circuit are identically connected to each other to define an output of 240 or 480 volts, for example, in a typical generator.

The illustrated three phase exciter winding 8 is in accordance with well known construction, except for the connection of the exciter primary winding 10 which is specially constructed and connected in circuit with the main windings 13–15 to derive power therefrom in accordance with the assignee's no-tap connection.

Referring to FIG. 1, the exciter stator winding 10 constitutes the primary winding of the rotating exciter, and includes three phase windings 26, 27 and 28, each of which is identically constructed. Referring to phase winding 26 for purposes of description, the phase winding includes a shunt winding 30 and a series winding 31. The series winding 31 is shown as a single continuous winding connected directly in series with the one coil 22 within the parallel connected coils 22 and 23 of the inner main phase winding 18, shown by connecting lead 34. The opposite side of the series winding is connected to the common connection of the two main coils. The lead 35 of the shunt winding 30 is connected directly to the one side of the main coil of the inner phase coils of the first phase. The opposite side of the shunt winding is connected to a floating neutral connection. In this mode, the shunt coil 30 is energized by the full voltage of the one main winding, with the series current provided by a single one of the two coils. Thus, in a typical 240/480 voltage generator, the shunt winding 30 is connected across the 240 volts of the main coil 22. The series winding 31 carries the current flowing through the same coil. In the high voltage connection, the same voltage conditions are applied to the exciting winding. The shunt winding 30 is in a three phase wye connection and connected directly in parallel with the one main winding 18.

In the illustrated embodiment of the original no-tap design shown in FIG. 1, the exciter windings are all shown as single continuous wound coils. In fact, each of the shunt windings and each of the series windings was formed as two wound coils, with the end leads series connected to each other to form a single winding in each branch of the circuit. Thus, each series winding is constructed to, and does, function exactly as a single continuous wound coil. The windings are appropriately illustrated as shown in FIG. 1. Such fabrication coil is conventional for purposes of convenience and cost effective winding of the various phase windings of the generator and the exciter.

In operation, one distinct advantage of the new no-tap design of FIG. 1 resides in the elimination of the tapped coils and the lesser number of total interconnection for connecting of the primary winding of the exciter into the circuit of the main winding. Thus, considering that each connection of the exciter winding to the phase winding requires a separate interconnection or lead wire running therebetween. The tapped winding, shown for example in the cross-referenced patent, requires twelve different lead connections. In contrast, the old no-tap design and the new no-tap design as subsequently disclosed, requires a maximum of six lead connections. In addition, to the above advantage, the series current is a minimum current condition which in turn permits the use of the size of the interconnect wiring. Thus, the circuit requires two interconnect leads per phase or a maximum of six connecting leads. The principal disadvantage of this design as previously discussed is the unbalanced state which occurs in the parallel connection of the main windings to provide the low voltage output. Thus, in the parallel connection of the outer main winding and the inner main winding of a phase, the location of an unbalanced circuit voltage condition arises which may, particularly in lower KW designs, results in an unacceptable voltage variation from the desired nominal voltage.

Figure 2:
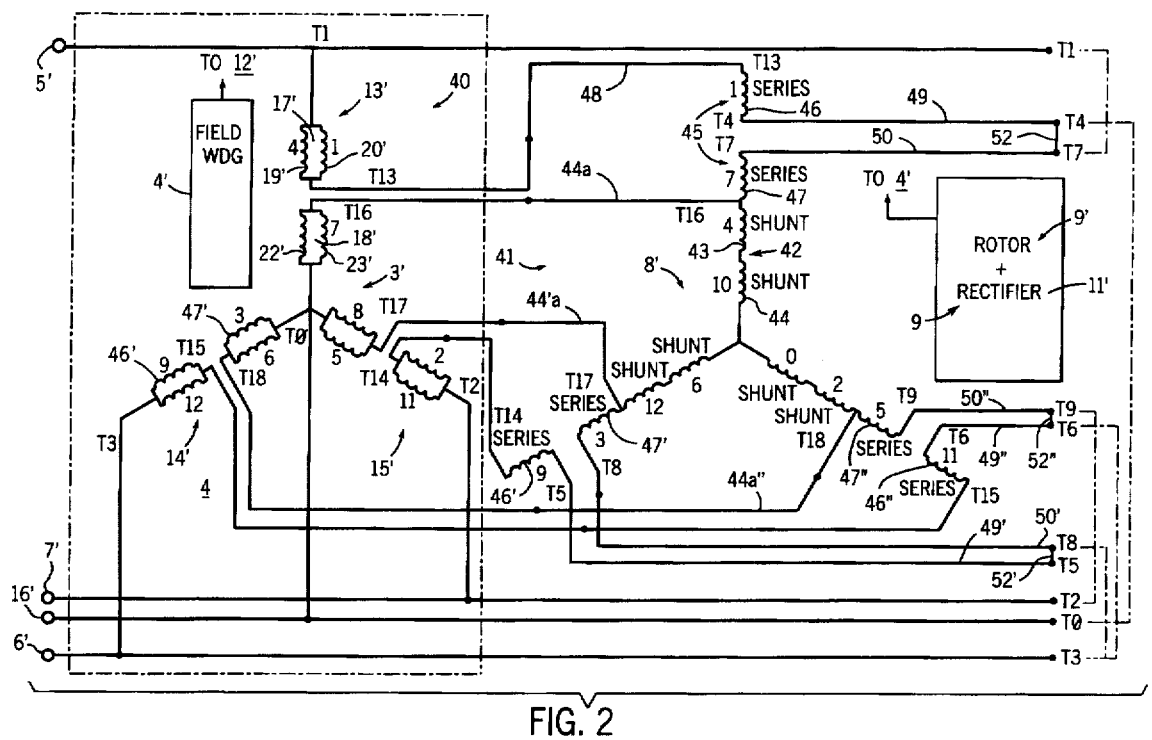
FIG. 2 is a similar schematic circuit diagram illustrating a circuit diagram constructed in accordance with the teaching of the present invention.
Figure 3:
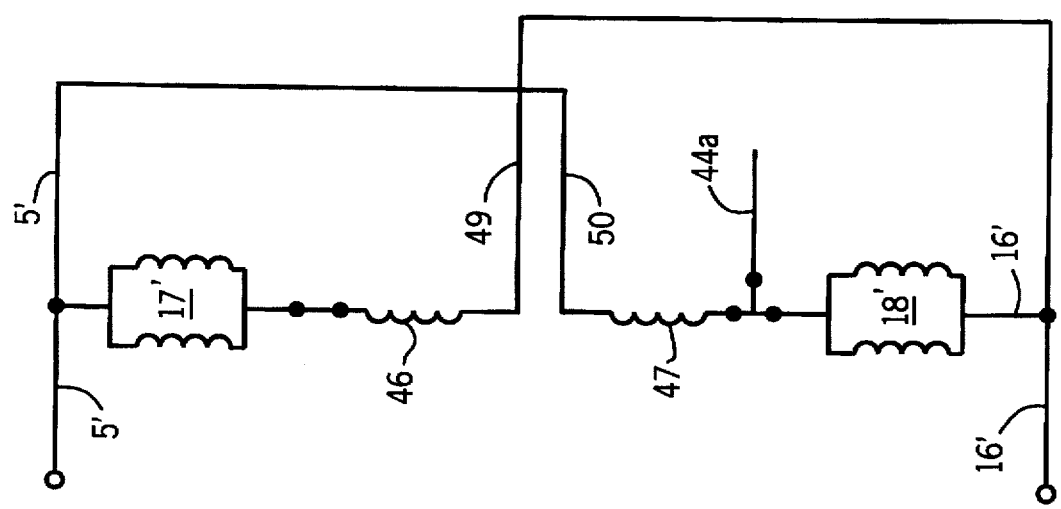
FIG. 3 is a view of one phase of the circuit shown in FIG. 2 illustrating the reconnection of the circuit in a low voltage circuit connection.

The present invention, as shown in FIGS. 2 and 3; provides a circuit for eliminating the disadvantages of the tapped windings and the prior art no-tap windings of FIG. 1. The corresponding elements of the circuit of FIG. 2 and of FIG. 1, with respect to the generator, are identified by primed numbers. The shunt windings of the exciter are connected to the generator windings in the same circuit connection as in the prior no-tap circuit and are similarly identified by primed numbers.

The series exciter windings and the interconnection thereof into the circuit is separately identified in FIG. 2 for clearly describing the differences in the circuit connection, and the resulting improvement in the circuit functioning.

FIG. 2 includes a schematic circuit illustration of the stator output winding 3' of the generator 40 and of the stator primary winding 8' and exciter 41.

The generator winding 3' is constructed essentially as shown in the prior no-tap system, with each phase winding 13', 14' and 15' consisting of the first and second main windings 17' and 18' each of which consists of first and second coils. In the structure of the present invention, however, the coils 19' and 20' of the main winding 17' and coils 22' and 23' of winding 18' are directly connected in parallel with each other and without internal connection of any winding of the exciter 41.

The illustrated exciter 41 is again a three-phase winding with shunt phase windings 30' constructed in the same manner as in the prior art. Each phase winding 42 of the shunt winding 8 is also connected into circuit in parallel with the main phase winding essentially in the identical manner as in FIG. 1.

More particularly, each shunt phase winding 42 for each phase is identically constructed and includes simultaneously wound coils 43 and 44 connected in series with a common connection. The series connected coils have one end connected to the common terminal and the outer terminal connected by a lead 44a to the output side of the inner main phase winding 18'.

A series windings 45 of exciter 40, however, is separately connected in a unique manner within each phase of the main output windings 17' and 18' as follows.

The series winding 45 of the exciter 41 thus consists of the two coils 46 and 47 which are simultaneously wound having the individual end terminals or leads. The two coils 46 and 47 of the windings are individually connected in circuit with the related power winding 13'. The first series coil 46 is connected in series with the main winding 17' via lead 48 forming an internal fixed connection. The opposite end of the coil 46 has a lead 49 for selective connection in circuit. The second series coil 47 of the winding 45 is connected to the winding 18' of the first phase winding 13'. As shown in FIG. 2, coil 47 is connected by lead 50 to the high potential lead of the main winding 18' and is connected in a common connection with the lead 44a of shunt winding 42. The opposite end of coil 47 ends in a terminal 50 for selective connection in circuit for the dual voltages, such as 240 and 480 volts.

The series coils for the other two phases 14' and 15' of the generator are identically interconnected into the corresponding phases of the stator phase windings of the main generator, with the interconnecting terminals of the series coils connected respectively to the leads 49 and 50.

For a high voltage connection, the respective interconnecting terminals 49 and 50 of the two series coils of each exciter phase winding are connected directly to each other, as shown by lead 52, thereby connecting the coils 46 and 47 in series with each other and in series between the two main windings 17' and 18'. The series coils 46 and 47 now carry full load current and will require wires of a corresponding current capacity.

To establish a low voltage connection, the internal terminals or leads 49 and 50 of the series coils 46 and 47 are connected as shown in phantom in FIG. 2 and in full line in FIG. 3. Terminal 50 is connected directly to the output terminal 5'. The terminal 49 is connected to the common terminal 16' and the corresponding lead. In this circuit connection, the series coil 46 and 47 are each connected directly in series with one of the corresponding main winding 17 and 18 respectively and thus in a series-parallel branch circuit, with the series-parallel branch circuit connected directly in parallel with each other as a result of the parallel connection of the two main windings between the terminal 5' and the neutral terminal 16'. Each of the main windings in series with one of the exciting coils is thus connected in parallel with each other. Each branch of the low voltage parallel phase circuits is essentially identically constructed and there is a complete elimination of any circulating currents.

As a result, this invention provides a direct exciter connection without the necessity of tapped coils, with a reduced interconnection similar to that provided by the prior limited no-tap arrangement while providing a system which is operative with a balanced voltage condition for essentially all alternator sizes.

The inventor has found that this present invention permits a construction of a no-tap design applicable over a wide range of alternator sizes whereas heretofore the application was limited by the fact that the no-tap design would not apply to all sizes where a dual voltage was specified.

Figure 4:
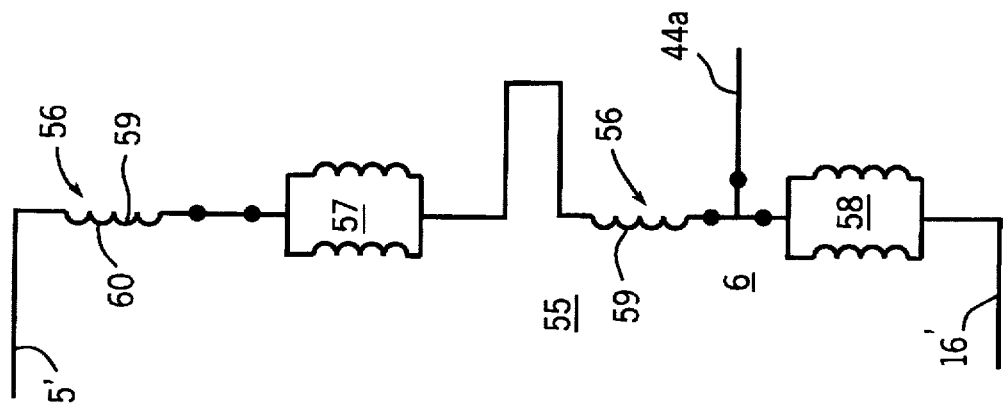
FIG. 4 is a view of one phase of the three phase generator illustrating an alternate connection operable in a circuit in which the line-to-ground voltage is not of a concern.

A possible alternate construction is schematically shown in FIG. 4. A single phase winding circuit 55 is illustrated for purposes of simplicity, with the connection between the exciter series winding 56 and first and second main windings 57 and 58. In the alternate connection shown in FIG. 4, the one series coil 59 of the excitation winding 56 is connected to the one main winding 58, in the manner as in the embodiment of FIG. 3. The second excitation coil 60 is connected to the outer main winding 58 and is shown connected between the output terminal 5' and the top or outer side of the first main winding 57. The bottom side of the main winding is connected directly together and connected directly to the interconnecting terminal. In the circuit of FIG. 4, the excitation winding is connected to 480 volts for purposes of description. As a result, there is a high exciter stator line to ground or neutral voltage generally on the order of 277 volts. If the line-to-ground voltage on a winding is not of any particular concern, the alternate circuit connection can be made. Generally, however, the lower line-to-ground voltage on the exciter stator is desirable and the circuit of FIGS. 2–3 is considered a preferred circuit. Thus, the circuit of FIG. 2 provides the reduction in the potential-to-ground without any adverse effect or degradation in the performance of the generator.

The no-tap designs of the preferred embodiment of this invention also may advantageously include a cost effective voltage regulator for maintaining the output voltage at a relatively constant level. The inventor discovered connection of the exciter shunt windings directly across the main windings establishing a high voltage source and a low current level excitation of the shunt winding. In a practical construction, an amperage on the level of one ampere resulted in contrast to a level of 20 amperes in the prior art tapped designs. As a result of the minimal current condition, a small AC electronic regulator can be connected to the system to continuously directly regulate the voltage in the AC circuit of the exciter shunt winding and therefore the output of the generator. The electronic regulator can provide continuous regulation, and such electronic regulators are readily constructed at a minimal cost compared to presently known systems of regulation.

More particularly, in the brushless unit of the present invention, the rotating three-phase exciter rotor includes a rotating rectifying unit with the DC output connected to the rotating field of the generator. Thus, such generators have been operated without regulators because of the difficulty of providing a rotating regulating unit. Alternatively, AC regulation in the tapped winding system, such as would be required with the fixed non-rotating main output winding and the corresponding exciter stator winding, has been considered too costly in view of the high current levels encountered. In the tapped design, a relatively low voltage, such as 10 volts, is supplied to the exciter shunt winding. This requires a relatively significant current supply which is created by a shunt winding having a few turns.

The present inventor with the no-tap design establishes a relatively large voltage to the shunt winding and therefore only a small current supply is created by providing a high impedance shunt winding having a large number of turns. The relative low current level adapts the unit in corporation of a low cost AC electronic regulation system.

Figure 5:
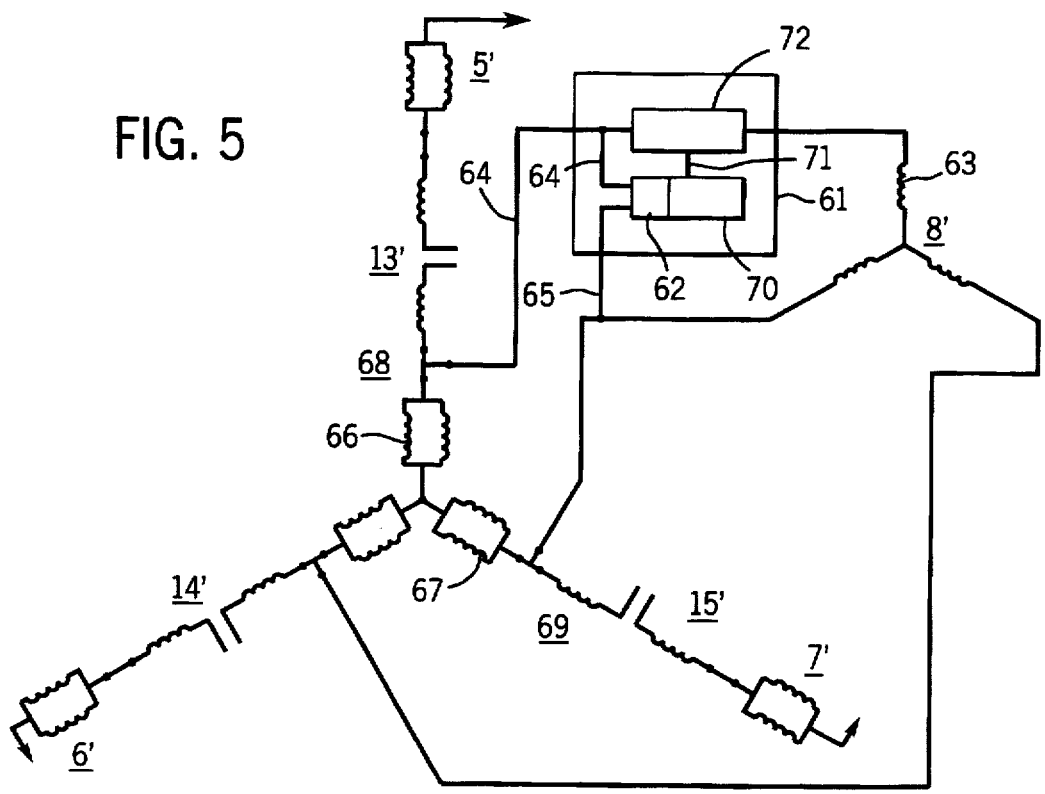
FIG. 5 is a view of the stator unit of a three-phase generator and exciter as illustrated in the previous embodiments with an AC voltage regulator connected in one phase of the shunt winding circuit.

A typical electronic regulating control unit 61 is diagrammatically illustrated in FIG. 5. A single phase sensing unit 62 is provided to control the phase current in a single phase of the three-phase exciter shunt winding 63. As illustrated, a single phase voltage is sensed by interconnecting of sensing leads 64 and 65 to the common connection between the inner paralleled main winding 66 and the main winding 67 in two phases 68 and 69. This is a typical single phase sensing of the output voltage of the generator 1. The sensed voltage signal is coupled to a reference control circuit 70 and compared with a signal related to the desired output voltage. The control circuit 70 generates an output signal at a control line 71 for activating a current level control unit 72 connected in series with the connecting line 73 to the selected shunt winding 63. A typical current level control unit 72 includes a bi-directional solid state control switch such as a triac with the selective firing of the bi-directional switch to vary the shunt current and thereby the excitation output voltage developed by the shunt winding within the exciter. This will result in a related change in the output of the exciter rotor and the rectified signal sent to the main rotating field of the main generator. The necessary internal components for the sensing and control circuit may of course take many different forms and constructions and can be readily provided by those acknowledgeable in the art of voltage regulation.

Figure 6:
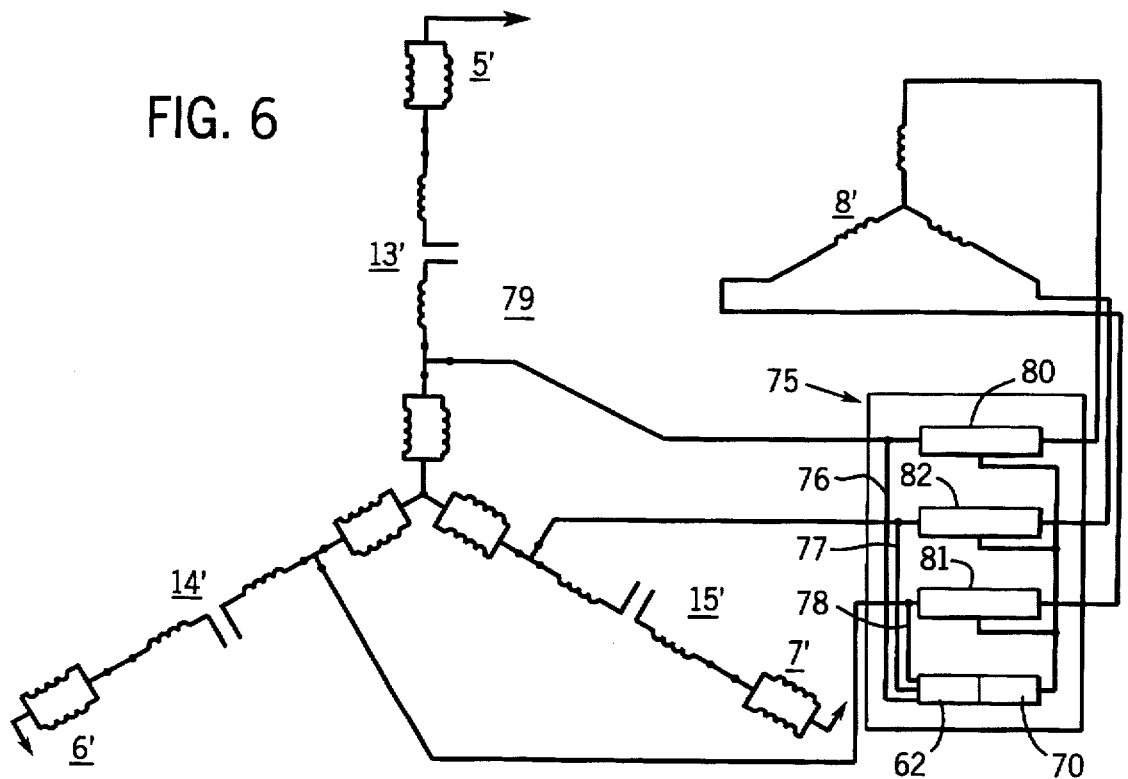
FIG. 6 is a view similar to FIG. 5 illustrating a similar system with regulation of each phase of the exciter shunt winding.

For optimum control, a three-phase sensing and three-phase control is desirable as shown in FIG. 6. Thus, in this instance, three separate phase signal units 75 are connected via leads 76, 77 and 78 to the three phases of the main generator stator winding 79. Separate bi-directional solid state switches 80, 81 and 82 are connected in the shunt winding connection leads.

As in FIG. 5, the system of FIG. 6 directly controls the AC current in the shunt winding and thereby the excitation and output voltage of the generator. The three phase sensing systems shown in FIG. 6 provides a higher degree and better regulation with an increased cost.

The reduction in the shunt connections in the no-tap design also reduces the cost by minimizing the necessary current controls. Cost effectiveness of the regulator is however particularly made by use of low current solid state switching devices. Solid state triggered devices are particularly applicable because of the low current in the shunt windings of the no-tap design.

The illustrated systems provide a relatively inexpensive regulator for achieving regulation on the order of one percent regulation with the single phase control.

Although illustrated using solid state switches, any current control unit which is connectable in series with the shunt winding can of course be used.

Various modes of carrying out the invention are contemplated as being within the scope of the following claims particularly pointing out and distinctly claiming the subject matter which is regarded as the invention.

I claim:

1. A self-excited generator apparatus comprising a generator having an output winding and a rotating field winding, said output winding having a first and second main winding adapted to be connected in parallel and alternatively in series with said output terminals to provide a low voltage output and alternatively a high voltage output, an AC exciter having a fixed primary winding including a shunt winding and a series winding, said shunt winding being connected across one of said main windings and establishes an AC voltage and current in said shunt windings, said series windings including a first coil and a second coil, said first coil being connected in series with said first main winding to form a first winding leg conducting AC current, said second coil being connected in series with said second main winding to form a second winding leg conducting AC current, connecting leads connected to said main windings and said output terminals and having a first connection connecting said legs in series to said terminals and a second connection connecting said legs in parallel to said terminals.

2. The self-excited generator of claim 1, wherein said generator has a three-phase output winding, said AC exciter having a corresponding three phase primary winding with each phase of the primary winding connected to corresponding main winding of said three phase output winding, and said exciter having a rotating three phase secondary winding coupled to the corresponding phase windings of said primary winding.

3. The self-excited generator of claim 2, wherein said first and second coils are connected between said first and second main windings.

4. The self-excited generator of claim 2, wherein said three-phase windings are wye connected and have a grounded common.

5. The self-excited generator of claim 2, wherein said three-phase windings are wye connected and have a floating neutral common.

6. The self-excited generator of claim 1, wherein said first and second coils are connected between said first and second main windings.

7. The self-excited generator of claim 1, wherein said first coil is connected to said first main winding between said first and second main windings, and said second coil is connected to said second main winding between said second main winding and said output terminal.

8. The self-excited generator of claim 1, including an AC regulator connected in circuit with said shunt winding of primary winding and said output winding and operable to regulate the output voltage of the generator.

9. The self-excited generator of claim 1, wherein said output winding is a multi-phase winding having identical output windings in each phase, said exciter includes a multi-phase primary winding with each phase connected to the same phase output winding to establish said first and second legs in each said phase winding of said output winding.

10. A field exciter unit for coupling a multi-phase AC power winding of a multi-phase alternating current generator to a relatively rotating DC field winding of said generator, each phase of said AC power winding having a first coil unit and a second coil unit adapted to be connected between first and second output terminals and in series for a high voltage output and in parallel for a low voltage output, comprising an AC exciter multi-phase winding with each exciter phase winding having a series winding including a first coil and a second coil, said first coil of said exciter winding being connected in series with said first coil unit of said power winding between an output terminal and said power winding, said power winding having the opposite side connected to an interconnection terminal, said second coil of said excitation winding being connected in series between said second coil unit of said coil unit and an interconnection terminal, said low voltage side of said second power winding connected to the low voltage output terminal of said generator, said exciter including a multi-phase shunt winding with each phase shunt winding connected across said second coil unit at the same phase, said circuit being constructed for a single voltage operation with a relatively high potential to neutral or ground voltage on the excitation winding, said circuit requiring a single interconnection line from each of said exciter phase winding to said generator power winding.

11. An alternating current polyphase generator, comprising a rotating direct current field winding, an AC power windings, a rotating exciter for exciting said DC field winding, said AC power winding including a plurality of phase windings, each phase winding including a first main winding and a second main winding adapted to be connected in series to establish a high voltage output and adapted to be connected in parallel to establish a low voltage output, said rotating exciter including a multiple phase stator winding having a plurality of AC phase windings corresponding to the phase windings of said AC power winding and each exciter phase winding having a shunt winding coupled to said main winding for establishing an excitation current output, said exciter having a multi-phase rotor winding connected to said multi-phase stator winding and having a rectifier unit connected to said rotor winding and having an output connection connected to said direct current field winding of said generator, each phase winding of said exciter stator winding including a shunt winding and a series winding, each said series winding including a first coil and a second coil, said first coil being connected in series with said shunt winding to an interconnection terminal and to the high potential side of said first main winding, said second coil of said excitation winding connected between the high potential side of said second main winding and an interconnection terminal, said interconnection terminals being selectively connected to each other and to said main power output terminals to respectively establish a high voltage connection and a low voltage connection.

12. A field excitation circuit for coupling the AC power windings of an alternating current generator to a relatively rotating DC field winding of said generator, comprising a rotating exciter having an AC primary winding including a shunt winding and a series winding, said AC power windings each having first and second main windings series connected between first and second output terminals, said first main winding having a first output lead connected to said first output terminal and having a second output lead, said second main winding having a first output lead connected to said second output terminal and having a second output lead, said second output leads being selectively connected whereby said windings can be connected in series for a high voltage output and in parallel for a low voltage output, said exciter series winding having first and second coils, said first coil connected to said second output lead of said first main winding and having a first interconnection terminal for connecting of said first coil in series circuit with said first main winding, said second series coil of said exciter winding connected to said second output lead of said second main winding and having a second interconnection terminal, said exciter shunt winding connected to said second output lead of said second main winding, whereby said interconnection terminals are connected to each other for series connection of said main winding and said exciter winding in an alternating current conducting circuit for a high voltage connection and whereby said main windings in series with said exciter coil are connected in parallel with each other between said first output terminal and said second output terminal in an alternating current conductor path for a low voltage connection and thereby establishing and maintaining a balance circuit condition regardless of the size of the generator.

13. A self-excited generator apparatus comprising a generator having an output winding and a rotating field winding, said output winding having a first and second main winding adapted to be connected in parallel and alternatively in series with said output terminals to provide a low voltage output and alternatively a high voltage output, an exciter having a fixed primary winding including a shunt winding and a series winding, a rotor having an exciter secondary winding coupled to said primary winding, a rectifier connected to said secondary winding and to said field winding, said shunt winding being connected directly across one of said main windings and subjected to the full output voltage of said main winding and conducting alternating current, and an alternating current electronic regulator having an input connected to said output winding and a current level control output connected in series with said shunt winding and operable to control the shunt winding current in accordance with the output voltage of said output winding.

14. The self-excited generator apparatus of claim 13 wherein said output winding is a multi-phase output winding and said alternating current electronic regulator includes a sensing voltage responsive input connected in a single phase sensing circuit connected to only one phase of said output winding of said generator to produce sensed voltage for at said input.

15. The self-excited generator apparatus of claim 14 wherein said electronic regulator includes a triggered solid state switching circuit including triggered switches connected in series with said shunt winding and in response to said sensed voltage to vary the turn on of said triggered switches in accordance with variations in the output voltage of the generator.

16. The self-excited generator apparatus of claim 13 wherein said generator is a three phase generator having a three phase output winding, said primary winding including a three phase primary winding, said electronic regulator input includes a three phase sensing unit coupled to said three phase output winding and said three phase primary winding to establish three individual voltage related signals, said control output of said regulator including three solid state switching devices connected one each in series with each of said shunt windings, and said sensing unit being connected to control firing of said switching devices to thereby control the current in each of said shunt windings and thereby the output of said secondary winding of said exciter and maintain regulation of the output voltage.

* * * * *

UNITED STATES PATENT AND TRADEMARK OFFICE
CERTIFICATE OF CORRECTION

PATENT NO. : 5,714,821
DATED : February 3, 1998
INVENTOR(S) : WILLIAM B. DITTMAN It is certified that error appears in the above-identified patent and that said Letters Patent is hereby corrected as shown below:

<u>In The Claims</u>

Claim 10, column 10, line 2, delete "coil unit" (second occurrence) and substitute therefor -- power winding; Claim 10, column 10, lines 3-4, delete "power winding" and substitute therefor -- coil unit --.

Signed and Sealed this

Ninth Day of November, 1999

*Attest:*

Q. TODD DICKINSON

*Attesting Officer*    *Acting Commissioner of Patents and Trademarks*